(12) United States Patent
Kress

(10) Patent No.: US 11,342,135 B2
(45) Date of Patent: May 24, 2022

(54) DEVICE FOR SWITCHING AN ELECTRICAL LOAD CIRCUIT OPERATED WITH HIGH VOLTAGE FROM A VOLTAGE SOURCE

(71) Applicant: IIE GMBH & CO. KG, Soyen (DE)

(72) Inventor: Ekkehard Kress, Wasserburg (DE)

(73) Assignee: IIE GMBH & CO. KG, Soyen (DE)

( * ) Notice: Subject to any disclaimer, the term of this patent is extended or adjusted under 35 U.S.C. 154(b) by 0 days.

(21) Appl. No.: 16/766,801

(22) PCT Filed: Nov. 26, 2018

(86) PCT No.: PCT/EP2018/082530
§ 371 (c)(1),
(2) Date: May 26, 2020

(87) PCT Pub. No.: WO2019/105882
PCT Pub. Date: Jun. 6, 2019

(65) Prior Publication Data
US 2020/0373099 A1    Nov. 26, 2020

(30) Foreign Application Priority Data
Nov. 29, 2017 (DE) ..................... 10 2017 011 039.5

(51) Int. Cl.
*H01H 1/14* (2006.01)
*H01H 3/26* (2006.01)
*H01H 1/24* (2006.01)

(52) U.S. Cl.
CPC ................ *H01H 3/26* (2013.01); *H01H 1/14* (2013.01); *H01H 1/24* (2013.01); *H01H 2003/268* (2013.01)

(58) Field of Classification Search
CPC ....... H01H 3/26; H01H 1/14; H01H 2003/268
See application file for complete search history.

(56) References Cited

U.S. PATENT DOCUMENTS 3,161,074 A * 12/1964 Korthaus ................. B61G 9/18
                                                    74/89.34
6,078,108 A *  6/2000 Froschl .................. H01H 1/365
                                                    200/400
9,418,807 B2 *  8/2016 Marlin ................... H01H 39/00

* cited by examiner

*Primary Examiner* — Vanessa Girardi
(74) *Attorney, Agent, or Firm* — Robert W. Morris; Eckert Seamans Cherin & Mellott, LLC

(57) ABSTRACT

The invention relates to a device for connecting and disconnecting an electrical load circuit, operated at high voltage by a voltage source, in a transportation means that is electrically driven by a drive operated at low voltage. According to the invention, a contact stud (6) is connected to the push rod (11) of a linear drive (2) and the contact stud (6) can be moved into at least two positions in a switch housing (4), wherein the switch housing (4) has, on its internal wall, at least two contact rings (5), one of which is connected to the voltage source (7) and the other is connected to the consumer circuit (8).

8 Claims, 2 Drawing Sheets

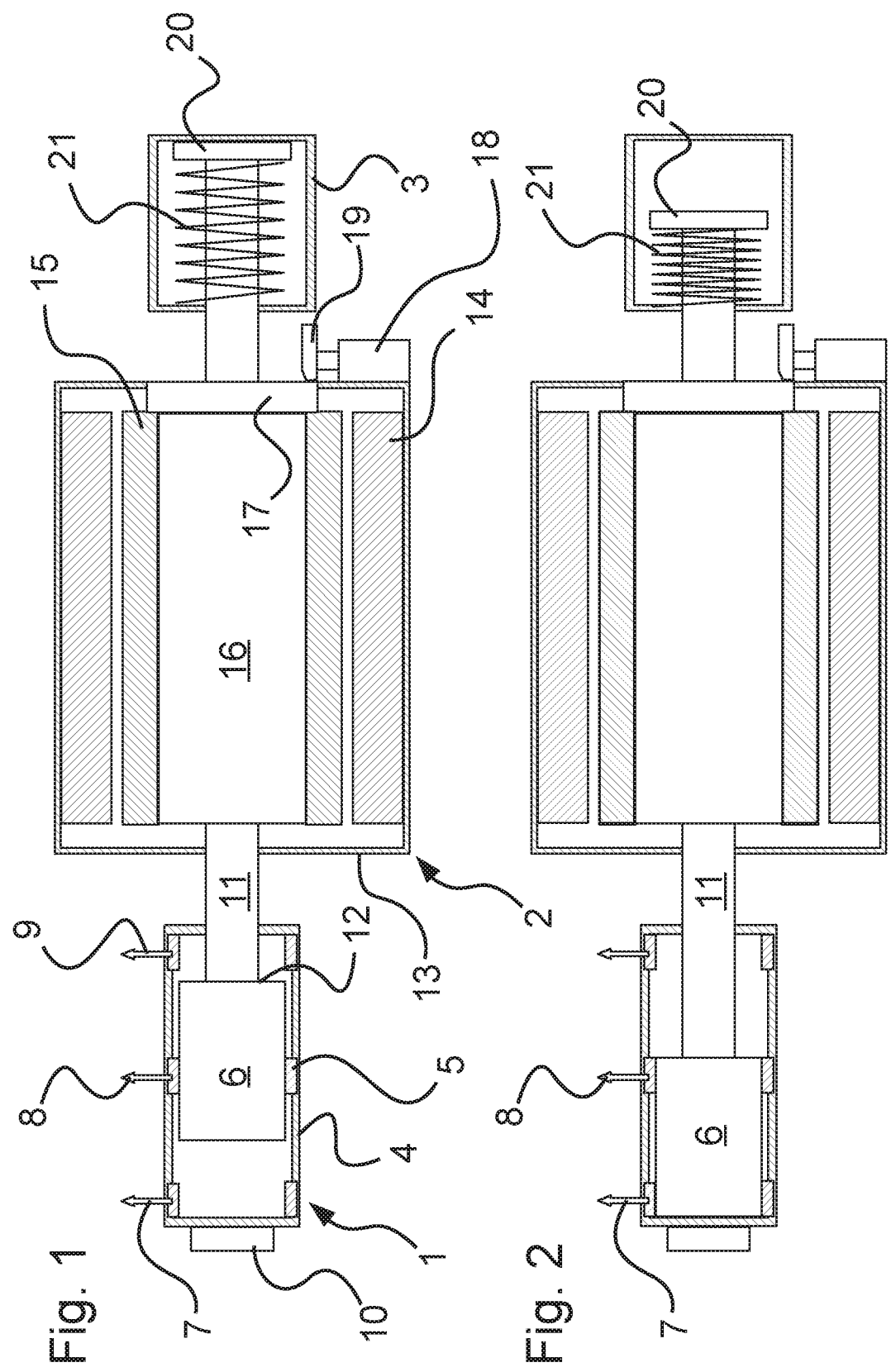

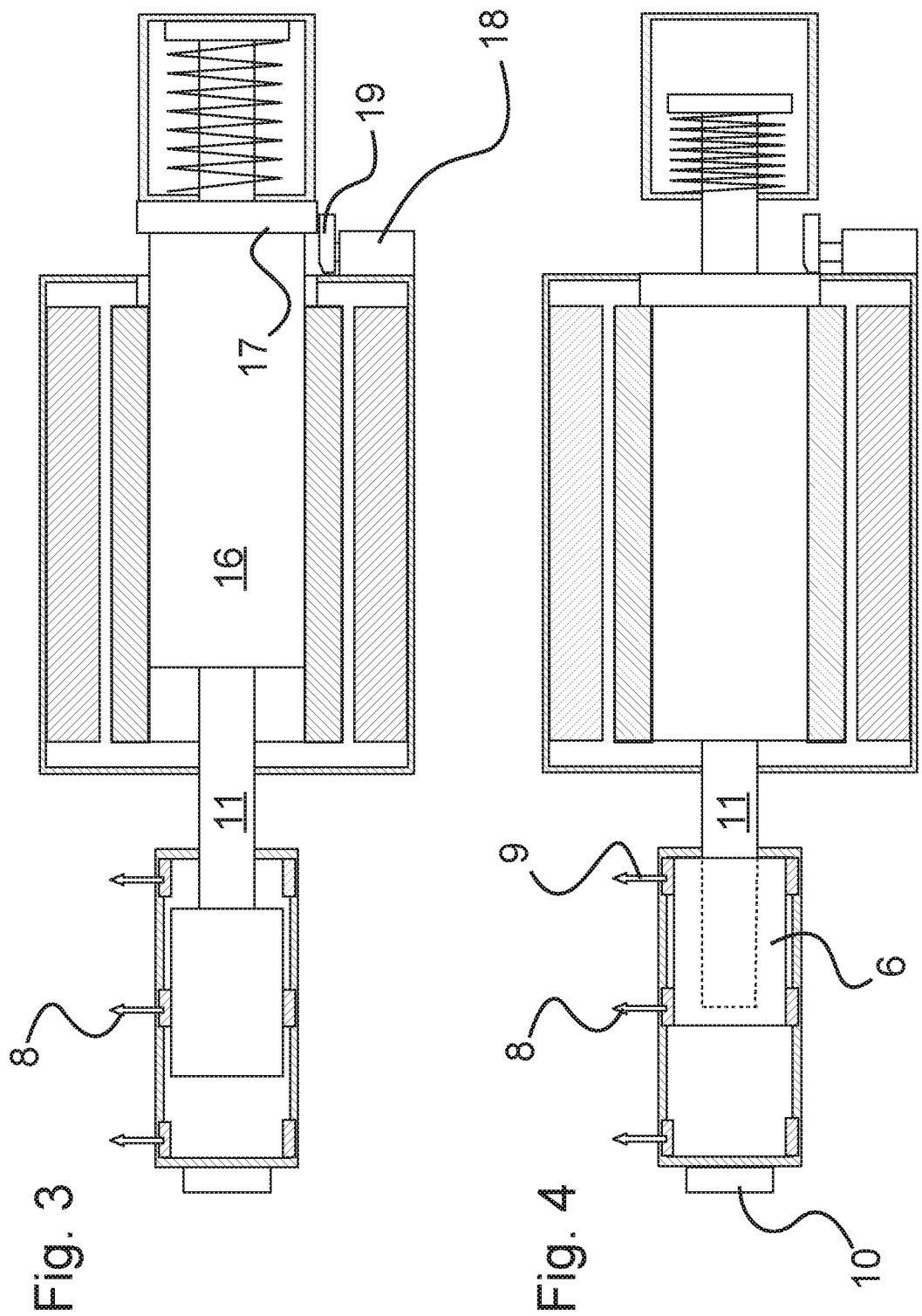

DEVICE FOR SWITCHING AN ELECTRICAL LOAD CIRCUIT OPERATED WITH HIGH VOLTAGE FROM A VOLTAGE SOURCE

CROSS REFERENCE TO RELATED APPLICATIONS

This application claims priority to International Application No. PCT/EP2018/082530, filed on Nov. 26, 2018 and published as WO2019/105882, which claims priority to German Patent No. DE 10 2017 011 039.5 which was filed on Nov. 29, 2017, the disclosures of which are incorporated herein in their entireties.

BACKGROUND

The invention relates to a device for switching an electrical load circuit operated with a high voltage from a voltage source according to the preamble of claim 1.

Pollutant emissions from internal combustion engines have been taken increasingly seriously in recent years. The use of electric motors is strongly encouraged in the mobile sector in order to reduce these emissions. It is assumed that the demand for electrical power can be met to an increasing extent through renewable energies.

In most cases, large currents and high voltages are necessary to replace internal combustion engines with electric motors. A large number of electrical storage cells, currently mostly lithium-ion batteries, are therefore series-connected.

The individual cells usually work with a voltage of approximately 3.6 V. In particular when used in motor vehicles, a voltage of more than 300 V is required for the electric motors, so that more than one hundred such cells have to be connected accordingly. Voltages of approximately 700 V are already being used today in certain vehicles.

Since the capacity of energy stores that can be carried in an electrically powered transportation means is relatively small, care must be taken to ensure that there is no discharge via the load circuit during downtimes. The load circuit must be completely disconnected from the energy store for this purpose. Usually, this is also not a problem, since the switching process takes place in a stationary state when no load is applied. A contactor, which holds the contacts in the closed position via magnetic force, is usually used for this purpose. Depending on the position in which the contactor is installed, there are always situations when the vehicle is driving in which strong acceleration (for example, when driving through potholes) affects the contactor. This allows the contacts to open in a period of time during which load is applied. This then leads to arcing and a corresponding erosion of the contacts. Such switches therefore do not have a long service life and often have to be replaced.

SUMMARY OF THE INVENTION

The invention is based on the object of designing a device for switching an electrical load circuit operated at high voltage from a voltage source such that both a connection and a disconnection between the load circuit and the voltage source can be carried out in a simple and reliable manner. Furthermore, the unintentional opening of the switching device will be prevented and the service life be greatly extended in this way.

The object is achieved according to the invention by a device for switching an electrical load circuit operated with high voltage from a voltage source having the features of claim 1. Characterized in that a contact stud is connected to the push rod of a linear drive and the contact stud can be brought into at least two positions in a switch housing, wherein the switch housing has at least two contact rings on its internal wall, one of which is connected to a voltage source and the other to the load circuit, a switching device is created that can be switched back and forth between at least two states, wherein the two states, regardless of the installation position in the transportation means, cannot be changed unintentionally even by extreme conditions while driving. The formation of an arc is reliably prevented since all intended switching operations take place without a load.

A high voltage is understood here to mean a voltage of a few hundred volts. The linear drive is powered by a standard on-board battery having low voltage (usually 12 V).

The invention can be used in all electrically driven transportation means. All devices for the transportation of people and/or goods by land, water and air are to be considered here as transportation means. "Electrically driven" means all transportation means that are at least partially electrically driven. This also includes so-called hybrid vehicles, which are driven partly by an electric motor and partly by an internal combustion engine.

A linear drive is to be understood as any drive that generates a linear movement. This thus includes all rotating drives that actuate a push rod provided with threads, but also piezo drives or solenoids that directly generate a linear movement. The only requirement is that the drives work with high forces and are also equipped with a high holding force.

Further details and advantages of the invention emerge from the dependent claims.

The contact stud is preferably connected only to the load circuit in the open position and to the load circuit and to the voltage source in the closed position. This enables precisely defined switching states that can be achieved over a relatively short displacement path. Only the conductive connection between the load circuit and the voltage source has to be interrupted or closed.

In order to be able to displace the contact stud in the switch housing, a powerful and safe drive is required. The linear drive is therefore very preferably designed as a stepper motor and the rotor has a threaded nut for the movement of the push rod designed as a threaded rod, wherein the push rod is secured against rotation and the threaded nut against rotation relative to the rotor. A stepper motor is nowadays a cheaply available component that can be controlled very precisely. Usually only initialization in one switch position is necessary, so that position sensors for the other switch positions can be largely dispensed with. The push rod can be moved with great force by a relatively small motor due to the thread translation. The holding power is also enormous. A stepper motor is also safe against simple manipulations, since a certain phase sequence is required for control.

For safety reasons, the switching device should disconnect the load circuit from the voltage source when the low operating voltage for the linear drive fails and an orderly shutdown of the load circuit would no longer be possible. For this purpose, the threaded nut is mounted concentrically displaceable to the axis of rotation and the push rod is pretensioned in the closed position of the contact stud in the direction of the open position of the contact stud, wherein the threaded nut is held in an operating position by a blocking element.

The blocking element must be designed such that, in the event of a failure of the voltage required for the orderly operation of the switching device, it is moved into a position which permits the threaded nut to be displaced into an inoperative position. The blocking element is therefore advantageously designed as a solenoid, which is located in the blocked position when voltage is applied and moves into the release position when the applied voltage is switched off. If the operating voltage for the orderly switching off of the switching device fails, the solenoid also drops out and releases the threaded nut, which then moves together with the pretensioned push rod and brings the contact stud in the switch housing into the open position. In order to avoid an arc, a large pretensioning force must be generated, which accelerates the push rod strongly and moves the contact stud quickly.

However, the load circuit should not only be disconnected from the voltage source in the event of a failure of the operating voltage for the switching device, but also when the transportation means is involved in an accident. This is the only way to prevent the high voltages with which the load circuit is fed from being transferred to components that come into contact with people or possibly with fuel or other easily flammable substances. A gas generator is therefore particularly advantageously connected to the switch housing and is connected to an impact sensor via a controller. The gas pressure generated by the gas generator develops a large force, so that the contact stud can move rapidly into the open position. This high speed helps avoid an arc. However, the fact that the gas also flows around at least one contact stud when the connection is disconnected also prevents the build-up of an arc (spark quenching).

In order to be able to move the contact stud from the closed position into the open position by the gas pressure generated by the gas generator, it would be possible to provide the push rod and the threaded nut with a relatively steep thread. Since the rotor would also have to be rotated in this case, the system has a certain inertia and the shutdown process would take a longer period of time. A predetermined breaking point is therefore provided in an advantageous embodiment. The movement of the contact stud into the open position in the event of an accident can take place very quickly in this way without rotating the rotor.

The predetermined breaking point can, for example, be provided directly in the push rod. Two concentric push rod parts could be connected to one another by pressing for this purpose. The two push rod parts slide into each other as soon as a large force acts on the contact stud. However, the contact stud is particularly advantageously designed as a hollow cylinder closed on one side and the predetermined breaking point has a star-shaped connection between the push rod and the open side of the hollow cylinder. There are no mixed states in this embodiment; it is clearly recognizable whether the predetermined breaking point is intact or broken.

A third contact ring is advantageously provided on the internal wall of the switch housing and is connected to earth or ground. It is possible to connect the load circuit to ground in the open position of the switching device in this way. In this case, a resistor is preferably provided between the third contact ring and the ground, so that a slow outflow of the charge can take place after switching off.

However, the third contact ring is preferably only provided for an accident, so that there is no conductive connection between the contact stud and the third contact ring in the normal open position of the switching device. In order not to endanger people after an accident, the charge should be discharged from the load circuit as quickly as possible after such an event. In this embodiment, no resistance may be provided between the third contact ring and the ground.

When the gas generator is ignited, the contact stud is moved into an emergency position in which it connects the load circuit to earth or ground. In this emergency position, the contact stud connects the contact ring, which is connected to the load circuit, to the third contact ring. It does not matter if there is a weld due to a high current, since the switching device has to be replaced after an accident anyway.

The switching device according to the invention can also be provided on both connections of the load circuit, so that the load circuit is connected to ground with both its positive pole and its negative pole after an accident.

Further details and advantages of the invention arise from the description of an embodiment, which is explained in detail with reference to the drawing.

BRIEF DESCRIPTION

FIG. 1 is a schematic sectional view of an embodiment with the switch in the open position, in accordance with various embodiments;

FIG. 2 is an embodiment in accordance with FIG. 1 with the switch in the closed position, in accordance with various embodiments;

FIG. 3 is an embodiment in accordance with in FIGS. 1 and 2 after an emergency shutdown, in accordance with various embodiments; and FIG. 4 is an embodiment in accordance with FIGS. 1 and 2 after activation of the gas generator, for example, after an accident, in accordance with various embodiments.

DETAILED DESCRIPTION

The embodiment shown in FIG. 1 has a main switch 1 which is switched via a linear drive 2. The linear drive 2 has a stator 14 fixedly installed in the drive housing and a rotor 15 rotatably mounted within the stator 14. A threaded nut 16 is provided concentrically to the axis of rotation of the rotor 15, the threaded nut 16 being connected torque-proof to the rotor 15, but being mounted displaceably along the axis of rotation of the rotor 15.

A push rod 11 is also provided concentric to the axis of rotation of the rotor 15, the push rod 11 is mounted such that it is displaceable along the axis of rotation, but does not take part in the rotation of the rotor 15 and the threaded nut 16 connected torque-proof thereto. The push rod 11 is provided in the region of the threaded nut 16 with an external thread which is in operative contact with the internal thread of the threaded nut 16.

At its end opposite the main switch 1, the push rod 11 is provided with a push rod flange 20. This protrudes into a spring housing 3, which is installed in a fixed position to the drive housing 13. There is the spring 21 between the push rod flange 20 and the internal wall of the spring housing 3 facing the drive housing 13, the spring 21 pretensioning the push rod flange 20 slightly against the internal wall of the spring housing 3 opposite the drive housing.

The round nut flange 17, which is located in a corresponding recess in the drive housing 13, is connected to the threaded nut 16. In addition to the recess for the nut flange 17, a solenoid 18 is fastened to the drive housing 13. This solenoid 18 is provided with a locking lever 19 which, when the solenoid 18 is energized, locks the nut flange 17 and in this way prevents the threaded nut 16 from displacement in the direction of the axis of rotation of the rotor 15.

The main switch 1 has a fixedly mounted switch housing 4 and a contact stud 6 which is displaceably mounted within the switch housing 4. The contact stud 6 is designed as a hollow cylinder which is closed on its end face facing away from the push rod 11. On its open side, it is connected to the push rod 11 via a predetermined breaking point 12.

The predetermined breaking point 12 is not explicitly shown in the drawing, but a possible embodiment will be explained below. The predetermined breaking point 12 is preferably designed as a separate component. It has an inner ring which is connected to the push rod 11. It also has an outer ring which is connected to the open edge of the hollow cylinder of the contact stud 6. The inner and outer edges are connected to one another via three rays. The rays are designed so that they break off when a predetermined force acts between the inner and the outer ring. The rays therefore form the actual predetermined breaking point.

The switch housing 4 has three annular depressions in its internal wall, into which depressions the contact rings and 5 are inserted. The left contact ring is in contact with a connection 7 to the voltage source, the middle one to the load circuit with a connection 8 and the right one to ground with a connection 9. The contact stud 6 is designed such that it can electrically connect two contact rings to one another.

A gas generator 10 is fastened on the side of the switch housing 4 opposite the drive 2. This is connected to the interior of the switch housing 4 via openings, not shown here. There are preferably still gas outlet openings between the left and the middle contact ring, close to the middle contact ring, but these are also not shown here.

The function of use in an electric vehicle will be described in detail below with reference to the different positions of the device according to the invention in FIGS. 1 to 4. It is assumed that the electric vehicle has a 12 V on-board battery and a voltage source having an output voltage of approx. 400 V. The load circuit, in this case an electric motor or a plurality of electric motors, is supplied with the voltage source.

FIG. 1 shows the switching device in the open position. In this position, the contact stud 6 only contacts the connection 8 to the load circuit. There is therefore no voltage at the load circuit. The ignition key is already located in the ignition lock, so that the solenoid 18 is energized via the 12 V on-board battery. The locking lever is therefore in the blocking position in which the threaded nut 16 is prevented from displacement along the axis of rotation of the rotor 15 via the nut flange 17. The linear drive 2 is also energized via the 12 V on-board battery after turning the ignition key. The push rod 11 is displaced to the left by the rotation of the rotor 15 together with the threaded nut 16 in the opening direction.

The position after completion of this movement is shown in FIG. 2. The main switch 1 is in the closed position. The contact stud 6 connected to the push rod 11 via the predetermined breaking point 12 has reached the far left side of the switch housing 4. It thereby creates an electrically conductive connection between connection 7 to the voltage source and connection 8 to the load circuit.

The push rod flange 20 has also taken part in the movement of the push rod 11 and is located to the left of the starting position. The spring 21 was thereby tensioned. The push rod 11 with the contact stud 6 and the threaded nut 16 are now pretensioned in the opening direction of the main switch 1. However, a corresponding opening movement of the push rod 11, contact stud 6 and threaded nut 16 is prevented via the locking lever 19 and the nut flange 17.

When the electric vehicle is switched off, the linear motor 2 is energized when the ignition key is turned back such that the rotor 15 rotates in the opening direction. The push rod 11 and the contact stud 6 are pushed back into the position shown in FIG. 1. The main switch 1 is again in its open position.

When the ignition key is removed from the ignition lock, the connection of the solenoid 18 to the 12 V on-board battery is then also interrupted, so that the locking lever 19 moves into a release position, not shown in FIG. 1. However, this has no influence on the position of the threaded nut 16 and the push rod 11, since the push rod flange 20 already rests on the internal wall of the spring housing 3 and cannot be displaced further to the left.

Should the 12 V on-board battery fail for any reason during the operation of the electric vehicle (see FIG. 2), it would no longer be possible to disconnect the voltage source from the load circuit, since the linear drive 2 can no longer be energized. The spring 21 and the solenoid are provided for this situation. Starting from the operating position shown in FIG. 2, if the 12 V on-board voltage fails, the solenoid 18 drops out and the locking lever 19 moves into its release position.

As a result, the force of the spring 21 now acts on the push rod 11 via the push rod flange 20 and displaces this together with the threaded nut 16 and the contact stud 6 to the right until the push rod flange 20 rests again on the internal wall of the spring housing. The main switch 1 is now in the open position as in FIG. 1. The connection between the voltage source and the load circuit is consequently interrupted. The position after a failure of the 12 V on-board voltage is shown in FIG. 3.

The electric vehicle can be put back into operation as soon as a repair has been carried out. When the ignition key is inserted into the ignition lock, the locking lever 19 cannot be moved into its blocked position, since the nut flange 17 prevents it from doing so. The controller, not shown here, therefore energizes the linear drive 2 in the opening direction. Since the push rod 11 cannot be displaced further to the right, the threaded nut 16 is pressed back into the rotor 15 to the left. After reaching the normal position of the threaded nut 16 (as in FIGS. 1, 2 and 4), the locking lever 19 can now move back into its blocked position and the electric vehicle is ready to start again (see FIG. 1).

If the electric vehicle is involved in an accident, the load circuit will be disconnected from the voltage source very quickly. Starting again from the operating position in FIG. 2, the gas generator 10 is ignited via an impact sensor and the controller. The resulting gas flows into the switch housing 4 and builds up a high pressure there. As a result, the predetermined breaking point 12 breaks and the contact stud 6 is pressed to the right until it rests on the side wall of the switch housing 4 facing the linear drive 2. This position is shown in FIG. 4. The gas outlet openings (not shown here) are provided in addition to the middle contact ring so that the internal pressure does not lead to an explosion of the switch housing 4.

In FIG. 4, the contact stud 6 establishes a connection between the connection 8 to the load circuit and the connection 9 to the ground. In this way, not only can the load circuit be disconnected from the voltage source in the event of an accident, but it can also be discharged. Ideally, a switching device according to the invention is provided between the positive pole of the voltage source and the load circuit and the negative pole of the voltage source and the load circuit. In this case, both the negative connection and the positive connection of the load circuit are connected to ground in the event of an accident.

For a recommissioning, the switching device must be replaced after the gas generator 10 has been triggered.

However, the application of the invention is not only limited to transportation means, it can also be used in fixed installations. For example, it can make sense to disconnect a photovoltaic system from the load circuit with an inverter and/or a power store via one or two of the switching devices according to the invention.

The above-described embodiments of the disclosure are presented for purposes of illustration and are not intended to be limiting in any way.

REFERENCE NUMBER LIST

1 main switch
2 linear drive
3 spring housing
4 switch housing
5 contact rings
6 contact stud
7 connection to the voltage source
8 connection to the load circuit
9 connection to ground
10 gas generator
11 push rod
12 predetermined breaking point
13 drive housing
14 stator
15 rotor
16 hexagon nut
17 round nut flange
18 solenoid
19 locking lever
20 push rod flange
21 spring

The invention claimed is:

1. A device for switching an electrical load circuit operated at high voltage from a voltage source in an electrically powered transportation means by a drive operated at low voltage, wherein a contact stud is coupled to a push rod of a linear drive and has a predetermined breaking point to the push rod, the contact stud being operable to move into at least two positions in a switch housing, wherein the switch housing has at least two contact rings on its internal wall, wherein a first contact ring of the at least two contact rings is coupled to the voltage source and wherein a second contact ring of the at least two contact rings is coupled to the load circuit, wherein the linear drive is a stepping motor and comprises a rotor having a threaded nut for moving the push rod designed as a threaded rod, and the push rod is secured against rotation and the threaded nut against rotation relative to the rotor.

2. The device according to claim 1, wherein the contact stud is coupled to the load circuit in an open position, and wherein the contact stud is coupled to the load circuit and voltage source in a closed position.

3. The device according to claim 1, wherein a gas generator is coupled to the switch housing and is coupled to an impact sensor via a controller.

4. The device according to claim 1, wherein the contact stud is designed as a hollow cylinder closed on one side and the predetermined breaking point has a star-shaped connection between the push rod and the open side of the hollow cylinder.

5. The device according to claim 2, wherein the threaded nut is mounted concentrically displaceable to an axis of rotation and the push rod is pretensioned toward a closed position of the contact stud such that the push rod is prevented by a lock from transitioning the contact stud to the closed position, and wherein the threaded nut is held in an operating position by a blocking element.

6. The device according to claim 5, wherein the blocking element is a solenoid located in the blocked position when voltage is applied and moves into the release position when the applied voltage is switched off.

7. The device according to claim 1, wherein a third contact ring is provided on the internal wall of the switch housing, which contact ring is connected to earth or ground.

8. The device according to claim 1, further comprising a gas generator, and wherein when the gas generator is ignited, the contact stud is moved into an emergency position, and wherein in the emergency position, the contact stud coupled the load circuit to earth or ground.

* * * * *